Patented Jan. 19, 1943

2,309,005

UNITED STATES PATENT OFFICE 2,309,005

METHOD OF MAKING SPONGE RUBBER

Stewart R. Ogilby, Staten Island, N. Y., assignor to United States Rubber Company, New York, N. Y., a corporation of New Jersey No Drawing. Application January 15, 1941, Serial No. 374,473

2 Claims. (Cl. 260—723)

This invention relates to methods of making sponge rubber, and more particularly to processes for producing sponge rubber from rubber latex compositions.

According to the present invention, a latex composition is beaten or whipped or otherwise converted into a froth or foam, and then frozen or subjected to reduced temperature to irreversibly coagulate the rubber solids therein, thereby forming a permanent sponge rubber mass superior to those produced by prior methods.

It is well known that when a heat-sensitive latex, that is, a latex composition which is coagulable upon heating, is whipped into a foam and subjected to sufficient heat to irreversibly coagulate the rubber solids in the foam, the cell walls in the foam are subject to a certain amount of breakdown. This breakdown of the cells or bubbles is believed to be due in part to the natural drainage taking place in the foam with the attendant weakening of the cell walls, and in part to the expansion of the gas entrapped within the cells. This breakdown of the cell walls results in an increase in the average size of the pores in the sponge, with the result that the final sponge rubber article contains pores which on the average are larger than were the bubbles in the original foam. The breakdown of cell walls may be carried to such a point that the final sponge will have a loosely stereoreticulate structure, i. e., a structure having the appearance of a three-dimensional net, which is usually regarded as undesirable. In the prior art process for manufacturing latex sponge by the use of either heat-sensitive latices or latices which contain a delayed action coagulant, particular precautions must be taken and modifications must be made in the compounding and processing of the latex compound in attempting to avoid this stereoreticulate structure and to obain a final sponge article in which the pores approximate as closely as possible to the average bubble size in the original foam.

The present invention possesses the important advantage over these prior methods in that without employing these previously mentioned precautions, it is possible to obtain a sponge which retains to a great degree the original pore size and arrangement of the uncoagulated foam, and accordingly has a substantially uniform texture.

According to the present invention, sponge rubber is produced by first converting the latex composition into a foam and then reducing, preferably rapidly, the temperature of the foam sufficiently to irreversibly coagulate the rubber solids therein contained. The thus gelled or coagulated foam may then be dried and vulcanized to form a sponge rubber composition.

The latex composition used in the present process may be a latex to which have preferably been added certain cold-sensitizing agents, i. e., materials such as gelatin, which, when added to a latex which will not normally coagulate irreversibly when frozen, will cause such a latex to coagulate irreversibly when frozen. According to the present invention, moreover, with certain commercial latices now available, it is also possible to prepare a foam which will be cold-sensitive even without a cold-sensitizing agent, that is, a foam which will coagulate irreversibly when chilled to a sufficiently low temperature; whereas the same latex composition, unfoamed and in bulk, is not cold-sensitive. The reason for this phenomenon is not entirely understood; but its significance is that it is possible according to the invention to readily prepare a foam which can be irreversibly coagulated on freezing, from a latex composition which does not contain any added cold-sensitizing agent, and thereby obtain a latex sponge which for certain purposes is superior to a similar sponge made from a latex composition containing added cold-sensitizing agents.

The advantages of the method of preparing latex sponge by freezing a foam to irreversibly coagulate it, arise primarily from the fact that by chilling the foam rapidly, the liquid in the cell walls is immobilized thus preventing the cell wall drainage discussed above. Because the present process brings about the coagulation of the foam by a decrease rather than an increase in temperature there is no tendency for the gas within the cells to expand; rather, there is a tendency for the gas to contract with the result that it is thus possible to obtain a sponge having a structure in which the average pore size is equal to or somewhat less than the average bubble size in the original foam. The result is the formation of a sponge having a very desirable structure.

EXAMPLE I

A commercial latex composition of the following formula was employed:

Compound 1

| Latex: | Parts by weight |
|---|---|
| Rubber | 100 |
| Water | 61 |
| Ammonia | 1.32 |
| Sulphur paste (62.5%) | 5.0 |
| Accelerator emulsion (50%) | 1.5 |

This compound is converted to a foam by whipping it in known manner until a stiff froth was obtained. The foam or froth was then deposited in a suitable mold and was chilled rapidly to —60° C. The rate of reduction of temperature was such that the composition had attained this low temperature in 10 minutes. At this stage, the latex foam was coagulated or gelled irreversibly. When the thus frozen foam was warmed up to room temperature the gel structure remained intact, leaving a wet sponge rubber article of shape determined by the interior of the mold. The article was then removed from the mold and vulcanized in an atmosphere of saturated steam at a pressure of 40 pounds per square inch. The article was then finally dried.

An experiment was performed in which a quantity of the above latex composition unfoamed and in bulk was rapidly frozen to a temperature of −60° C. under the conditions described above. When warmed, the latex film still had some of the rubber solids dispersed in the aqueous medium, thus showing that it had not coagulated irreversibly. The experiment demonstrates the fact that the frothed latex composition was more sensitive to coagulation by cold when frothed than in unfrothed condition. The present process, therefore, is particularly adapted to irreversibly coagulating by freezing a foamed latex composition which in continuous film is not irreversibly coagulable by freezing.

EXAMPLE II

In another example, a latex composition was prepared as follows:

*Compound 2*

| Latex: | Parts by weight |
|---|---|
| Rubber | 100 |
| Water | 57.4 |
| Ammonia | 1.04 |
| Dimethylamine oleate solution (10%) | 7.5 |
| Ammonia solution (28%) | 2.0 |
| Sulphur paste (62.5%) | 4.0 |
| Aqueous paste of zinc dibutyl dithiocarbonate (50%) | 1.0 |
| Zinc oxide paste (50%) | 10.0 |
| Aqueous gelatin solution (10%) | 30.0 |

A foam was prepared by whipping up the above compound in air until the desired foam density was produced. The foam was then placed in a mold and rapidly frozen to about −60° C. The reduced temperature caused the foam to gel irreversibly to produce a sponge which was cured for an hour in saturated steam and then dried. The texture of the finished product was found superior to that of Example I in average pore size, uniformity of pores, and texture.

Latex compositions according to Example II may also be foamed and then irreversibly coagulated by reducing the temperature to the order of −18° C. after which they may be vulcanized and dried. The sponge rubber thus produced is not, on the average, of such high quality as that which has been chilled at lower temperatures, with respect to uniformity of texture. It may be improved, however, by the addition either of a larger amount of gelatin or of other thickening agent, in order to compensate for the tendency of the latex to drain away from the surfaces of the small bubbles in the latex foam.

The original foam may be produced by injecting air or other gas into the liquid latex composition in any desired manner in the form of bubbles or gas cells, either by whipping the latex or by the use of chemical blowing agents. It is not necessary to reduce the temperature of some latex compositions to as low as −60° C. although it has been found that generally the lower the temperature, the finer is the texture of the resultant sponge rubber. The vulcanizing and drying operations may be carried out according to usual practice.

The term "latex" as used herein designates broadly coagulable dispersions of elastic materials including artificial dispersions of rubber or rubber-like materials, as well as natural latex, which may be preserved or compounded or otherwise treated as desired, as by vulcanization, and which may be in normal, concentrated, diluted or purified condition produced by methods well known in the art.

While I have shown and described certain present preferred methods of performing the invention, it is to be understood that it may be otherwise practiced within the spirit thereof and within the scope of the appended claims.

Having thus described my invention, what I claim and desire to protect by Letters Patent is:

1. The method of making sponge rubber which comprises converting a latex composition to a foam and reducing the temperature of said foam to within the range −60° C. to −18° C. and sufficiently to coagulate irreversibly the latex in the foam thereby forming sponge rubber.

2. The method of making sponge rubber which comprises converting a latex composition to a foam and reducing the temperature of said foam to about −60° C. to coagulate the latex in the foam thereby forming sponge rubber.

STEWART R. OGILBY.